US008572633B2

(12) United States Patent
Barros

(10) Patent No.: US 8,572,633 B2
(45) Date of Patent: Oct. 29, 2013

(54) EXCEPTION HANDLING FOR COLLABORATING PROCESS MODELS

(75) Inventor: Alistair P. Barros, Camira (AU)

(73) Assignee: SAP AG, Walldorf (DE)

( * ) Notice: Subject to any disclaimer, the term of this patent is extended or adjusted under 35 U.S.C. 154(b) by 1405 days.

(21) Appl. No.: 11/496,736

(22) Filed: Jul. 31, 2006

(65) Prior Publication Data

US 2008/0127205 A1  May 29, 2008

(51) Int. Cl.
*G06F 9/46* (2006.01)
*G06Q 10/00* (2012.01)

(52) U.S. Cl.
USPC ........................... 719/318; 719/320; 705/7.11

(58) Field of Classification Search
None
See application file for complete search history.

(56) References Cited

U.S. PATENT DOCUMENTS

| | | | |
|---|---|---|---|
| 4,912,628 A | 3/1990 | Briggs | |
| 5,225,978 A | 7/1993 | Petersen et al. | |
| 5,812,811 A | 9/1998 | Dubey et al. | |
| 5,848,393 A | 12/1998 | Goodridge et al. | |
| 5,917,489 A | 6/1999 | Thurlow et al. | |
| 6,092,095 A | 7/2000 | Maytal | |
| 6,308,224 B1 | 10/2001 | Leymann et al. | |
| 6,480,876 B2 | 11/2002 | Rehg et al. | |
| 6,662,359 B1 | 12/2003 | Berry et al. | |
| 7,469,406 B2 | 12/2008 | Barros | |
| 2004/0133876 A1 | 7/2004 | Sproule | |
| 2004/0254945 A1 | 12/2004 | Schmidt et al. | |
| 2005/0060706 A1 | 3/2005 | Doyon et al. | |
| 2005/0096960 A1 | 5/2005 | Plutowski et al. | |
| 2008/0127044 A1 | 5/2008 | Barros | |
| 2009/0089471 A1 | 4/2009 | Barros | |

OTHER PUBLICATIONS

Piyush Maheshwari, Sharon Si-Long Tam; Events-Based Exception Handling in Supply Chain Management using Web Services; Proceedings of the AICT/ICIW 2006; Feb. 19-25, 2006; 6 Pages.*
Zongwei Luo, Amit Sheth, Krys Kochut, John Miller; Exception Handling in Workflow Systems; Applied Intelligence, vol. 13, No. 2, Sep. 10, 2000, pp. 125-147.*
Umeshwar Dayal, Meichun Hsu, Rivka Ladin; Business Process Coordination: State of the Art, Trends, and Open Issues; Proceedings of the 27th VLBD Conference, Roma, Italy, 2001, 11 pages.*
Extended European Search Report for EP Patent Application No. 07004193.4, mailed on May 30, 2007, 7 pages.
Barros, Alistair et al., "Service Interaction Patterns", Proceedings of the 3rd International Conference on Business Process Management, LNCS, vol. 3649, 2005, pp. 302-318.
Waardenburg, M., et al., "Workflow Management in an Internet Environment", 2005, 14 pages.

(Continued)

*Primary Examiner* — Charles E Anya
*Assistant Examiner* — Kimberly Jordan
(74) *Attorney, Agent, or Firm* — Brake Hughes Bellermann LLP

(57) ABSTRACT

Implementations are described for exception handling for collaborating process models. Once an error or other exception is determined during execution of a process model, a collaborating process model is determined to be notified. The collaborating process model and the process model may be executing in a collaborating orchestration engine and in an orchestration engine, respectively. Thus, the collaborating process model may be notified of the exception. Then, the execution of the collaborating process model within the collaborating orchestration engine may be at least partly suspended, and execution of the process model and the collaborating process model may later be resumed once the exception has been resolved.

18 Claims, 7 Drawing Sheets

(56) References Cited

OTHER PUBLICATIONS

Russell, N., et al., "Workflow Exception Patterns", Proceedings of the 18th Conference on Advanced Information Systems Engineering, LNCS vol. 4001, 2006, pp. 288-302.

"Final Programme of Events", CAISE 2006, 18th Conference on Advanced Information Systems Engineering, Jun. 5-9, 2006, pp. 2-21.

"Databases Toolkit, Workflow Management in an Internet Environment ", CNET Networks, 2004, 1 page.

Mourao, H et al., "Exception Handling Through a Workflow", LNCS vol. 3290, 2004, 19 pages.

"Workflow Management Coalition Terminology & Glossary", The Workflow Management Coalition Specification, vol. WFMC-TC-1011, Issue 3.0, Feb. 1999, 65 pages.

Hollingsworth, D., "Workflow Management Coalition—The Workflow Reference Model", The Workflow Management Coalition Specification, vol. TC00-1003, Issue 1.1, Jan. 19, 1995, 55 pages.

Extended European Search Report for EP Application No. 07010388.2, mailed on Nov. 30, 2007, 7 pages.

Russell, N. et al., "Workflow Control-Flow Patterns: A Revised View", BPM Center Report BPM-06-22 , BPMcenter.org, 2006, 134 pages.

Van Der Aalst, W.M.P. et al., "Workflow Patterns", Distributed and Parallel Databases, vol. 14, Issue 1, Jul. 2003, 70 pages.

Russell, N. et al., "Workflow Data Patterns", QUT Technical report, FIT-TR-2004-01, Queensland University of Technology, 2004, 75 pages.

Russell, N. et al., "Exception Handling Patterns in Process-Aware Information Systems", BPM Center Report BPM-06-04, 2006, 29 pages.

Barros, A. et al., "Service Interaction Patterns: Towards a Reference Framework for Service-based Business Process Interconnection", Technical Report FIT-TR-2005-02, Faculty of Information Technology, Apr. 2005, 22 pages.

Little, M.C. et al., "An Examination of the Transition of the Arjuna Distributed Transaction Processing Software from Research to Products", Proceedings of the 2nd Conference on Industrial Experiences with Systems Software, vol. 2, 2002, 12 pages.

Jennings, N. R. et al., "Autonomous Agents for Business Process Management", Applied Artificial Intelligence, vol. 14, 2000, pp. 145-189.

Yan, J., et al., "A Service Workflow Management Framework Based on Peer-to-Peer and Agent Technologies", Proceedings of the Fifth International Conference on Quality Software, 2005, 8 pages.

Oasis Standard, "Web Services Business Process Execution Language Version 2.0", OASIS, Apr. 11, 2007, 264 pages.

Elmagarmid, A. K. "Transaction Models for Advanced Database Applications", The Seventh International Conference on Data Engineering, Apr. 9, 1991, 104 pages.

Russell, N., et al., "Workflow Resource Patterns", BETA Working Paper Series, WP 127, 2004, 73 pages.

* cited by examiner

EXCEPTION HANDLING FOR COLLABORATING PROCESS MODELS

TECHNICAL FIELD

This description relates to process models.

BACKGROUND

Modeling languages may be used as meta-languages to describe and execute underlying processes, such as business processes. For example, process modeling languages allow an enterprise to describe tasks of a process, and to automate performance of those tasks in a desired order to achieve a desired result. For instance, the enterprise may implement a number of business software applications, and process modeling may allow coordination of functionalities of these applications, including communications (e.g., messages) between the applications, to achieve a desired result. Further, such process modeling generally relies on language that is common to, and/or interoperable with, many types of software applications and/or development platforms. As a result, for example, process modeling may be used to provide integration of business applications both within and across enterprise organizations.

Thus, such modeling languages allow a flow of activities to be graphically captured and executed, thereby enabling resources responsible for the activities to be coordinated efficiently and effectively. The flow of work in a process is captured through routing (e.g., control flow) constructs, which allow the tasks in the process to be arranged into the required execution order through sequencing, choices (e.g., decision points allowing alternative branches), parallelism (e.g., tasks running in different branches which execute concurrently), iteration (e.g., looping in branches) and synchronization (e.g., the coming together of different branches).

During execution of process models, errors and other exceptions may occur. For example, hardware or software malfunctions may occur. As another example, a user or system may have a certain expectation of a remote system (e.g., an expectation of an available memory or processing capability thereof), which may be at least temporarily incorrect, so that the remote system may not be able to perform a desired or expected functionality. Of course, human error also may occur during a design or execution of a process model.

When an error occurs at a particular task of a process model, the results may or may not affect subsequent tasks of the process model (e.g., may affect some subsequent tasks, but not all). Similarly, if the process model is in communications with other (remote) process models (e.g., to coordinate shipments of goods), the results may or may not affect the remote process models.

In some cases, within a particular, process model, an exception may be handled, for example, by "rolling back" or undoing the problematic task(s), or by executing a contingency for the problematic task(s). However, such solutions may be of little use if the process model is collaborating with remote process model(s) that, for example, execute based on an expectation of the process model (e.g., where a delivery truck is dispatched in expectation of an order being ready, or where an order is placed based on expectation of payment being received). Consequently, such exceptions should be managed in order to reduce or minimize an effect on associated, collaborating process models.

SUMMARY

According to one general aspect, a system includes an orchestration engine configured to determine an exception in an execution of a first process model. The system includes an exception analyzer configured to analyze the first process model to determine an exception effect, and configured to determine that the exception effect potentially affects execution of a second process model. The system also includes an exception handler configured to store the exception effect in an exception repository, and configured to initiate an exception message for the second process model, as well as a message handler configured to forward the exception message to the second process model.

According to another general aspect, a method includes determining a collaborating process model to be notified of an exception in an execution of a process model, the collaborating process model and the process model executing in a collaborating orchestration engine and an orchestration engine, respectively. The method further includes notifying the collaborating process model of the exception, and suspending, at least partly, an execution of the collaborating process model within the collaborating orchestration engine, based on the notifying.

According to another general aspect, a system includes an orchestration engine executing a collaborating process model in collaboration with a process model. The orchestration engine is configured to receive an exception message related to a suspension of at least a portion of the process model, determine that the a suspension of the at least the portion of the process model requires suspension of at least a portion of the collaborating process model, and suspend the at least the portion of the collaborating process model.

The details of one or more implementations are set forth in the accompanying drawings and the description below. Other features will be apparent from the description and drawings, and from the claims.

DETAILED DESCRIPTION

Figure 1:
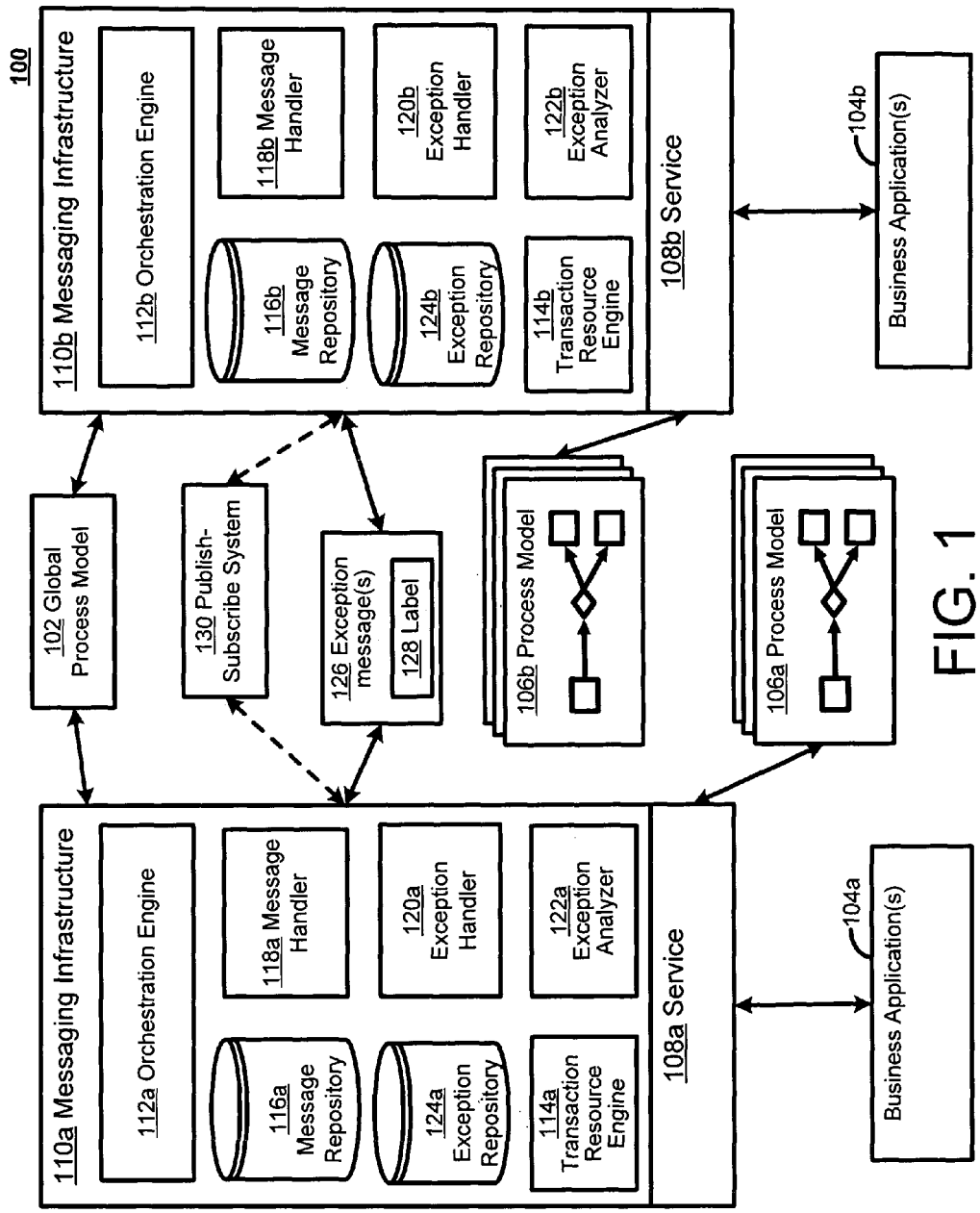
FIG. 1 is a block diagram of a system for exception handling for collaborating processes.

FIG. 1 is a block diagram of a system 100 for exception handling for collaborating processes. The collaborating processes may be implemented using corresponding process models, as referenced above. In the system 100, process errors and other exceptions of the process models may be recognized, and may be escalated to collaborating processes. The various collaborating processes, or portions thereof, may be suspended or diverted until the exceptions are resolved, whereupon the collaborating processes may resume (or abort, if necessary). In this way, resources may be used effectively and efficiently, and productivity of associated businesses or other organizations may be enhanced.

In the example of FIG. 1, a global process model 102 represents a business process model that is implemented, and agreed on, by a number of collaborating service providers. The service providers may use the global process model 102, for example, to make pre-arrangements regarding their interactions with one another (e.g., arrangements governing messages, message formats, or message types, as well as arrangements governing an order of the messages to be sent and/or tasks to be performed). By way of specific example, a purchase order may be sent by one service provider that may require acknowledgement, rejection, or some other action by one or more other service provider(s). The global process model 102 (also referred to as a global choreography model) thus provides a way of capturing, contractualizing, and implementing potentially complex and long-running message exchange sequences between service providers, in order to execute a desired business process.

For example, a business application 104a may be built and implemented by an enterprise or other entity to perform some business functionality, such as, for example, a manufacture (or other supply) of goods for sale. Meanwhile, a business application 104b of a collaborating business entity may represent a dependant business functionality, such as, for example, a distributor or other shipment process for the goods for sale. As shown, the business applications 104a, 104b may implement corresponding process models 106a, 106b that, analogously to the global process model 102, formalize and define the roles of the business applications 104a, 104b within the global process model 102.

Generally, the term business application should be interpreted broadly as including any application that is used in profit generation of some sort, although the business applications 104a, 104b also may refer to non-profit endeavors as well, including the legal system example above, but also including schools, churches, charities, hospitals, or virtually any other organization. Further, the business applications 104a, 104b are merely examples, and other applications, such as applications for personal use, also may be used.

The process model 106a may describe tasks to be performed, as well as messages that may be sent/received as part of such tasks, by the manufacturer as part of a manufacturing process. As referenced above, such process models generally include a plurality of nodes or tasks that are joined and ordered to obtain a desired result. That is, as illustrated by the example process model 106a illustrated in FIG. 1 (which is intended merely as a conceptualization or illustration of a process model, and not intended necessarily to represent a particular process model being executed in FIG. 1), nodes/tasks may be joined by appropriate edges (arrows) and control tasks (e.g., splits and/or joins) to obtain structures including parallel tasks, iterative tasks, nested loops, or other known task progressions.

In the example of FIG. 1, tasks of the global process model 102 and the process models 106a, 106b are executed at least in part using application services. For example, the business application 104a and the process model 106a may be associated with at least one service 108a. In this context, the service 108a refers to an application having one or more specific functionalities that are exposed to other applications, often over a network (e.g., the Internet) by way of a service interface (where an operation and use of the interface may be known or determined, as needed). When such a service (and/or an interface of the service) is exposed/available over the World Wide Web (referred to herein as the WWW or the web), then the service may be known as a web service. For example, the service 102 may provide virtually any functionality that may be provided by an application over a network, including, for instance, providing stock quotes, providing airline or other reservations, providing purchasing/invoicing functionalities, or providing some aspect of supply chain management or inventory control.

Using such services and service interactions to implement process models 106a, 106b may be referred to as a service-oriented architecture (SOA), in which, as just described, process tasks result in execution of the services. Further, processes that rely on services to realize process steps may themselves be deployed and accessed as services, which may be referred to as process-based service composition. Languages exist, such as, for example, the Business Process Execution Language (BPEL), that are designed to provide such compositions of services (e.g., web services), and thus provide a top-down, process-oriented approach to the SOA. Accordingly, BPEL or other such languages (such as, for example, the Web Services Flow Language (WSFL), the eXtensible language (XLANG), and/or the Business Process Modeling Language (BPML)), or modifications/extensions thereof, may be used to define the global process model 102 and/or the process models 106a, 106b.

In FIG. 1, in order to integrate the service 108a within the global process model 102, a messaging infrastructure 110a is included. Generally, the messaging infrastructure 110a facilitates instantiation and execution of the process model 106a in a way that allows recognition, escalation, and response of/to exceptions that may occur during execution of the process model 106a. That is, the messaging infrastructure 110a may be configured, for example, to determine an initial error occurring during execution of the process model 106a, to determine related or subsequent errors within the process model 106a that may be caused by the initial error, and to notify the process model 106b of such errors.

Moreover, as shown, the process model 106b is associated with a corresponding service 108b and messaging infrastructure 110b, and so may perform the same, similar, or associated functionality related to exception recognition and/or response. For example, upon receipt of notification from the messaging infrastructure 110a of an exception occurring during execution of the process model 106a, the messaging infrastructure 110b also may be configured to recognize resulting exceptions that may occur in the process model 106b, and to escalate such resulting exceptions either back to the process model 106a, or to other process models and/or messaging infrastructures (not shown). As described in more detail below, the messaging infrastructures 110a, 110b also may be configured to suspend or otherwise divert the process models 106a, 106b in response to such exceptions, and may be configured to resume (or abort, if necessary) execution of the process models 106a, 106b once the exceptions are resolved.

The messaging infrastructure 110a includes an orchestration engine 112a that is configured, among other functions, to execute an instance of the process model 106a. For example, the orchestration engine 112a may be in charge of ensuring that a given task of the process model 106a has actually been executed and completed, before allowing the given instance of the process model 106a to proceed to a following task. Other functions and examples of the orchestration engine 112a are described in more detail, below.

A transaction resource engine 114a provides transactional support to the orchestration engine 112a. That is, the transaction resource engine 114a, for example, works to ensure that transactions between the service 108a and the service 108b are maintained as part of the configured and instantiated version of the process model 106a, and that messages from/to the service 108a and the service 108b are matched and correlated with one another. For example, system and/or transaction identifiers may be included in, and/or added to, messages between the services 108a and 108b, as well as date/time stamps. Additionally, or alternatively, such transactional support may be included in message control data (e.g., a header) for each message.

A message repository 116a represents a database or other memory that may be used, for example, to store message types or templates, as well as actual messages (including both outgoing and/or incoming messages). For example, the message repository 116a may include a number of message types that are specific to, or associated with, (functionality of) the business application 104a. For instance, in the case where the business application 104a is used to generate purchase orders, there may be a number of associated message types in the message repository 116a, which may be pre-configured to some extent based on, for example, a type of purchase order or an identity of the recipient(s) of the purchase order. One type of message that may be stored in the message repository 116a, for example and as described in more detail, below, relates to exceptions that may occur during execution of the process model 106a.

A message handler 118a may be used to send and receive actual messages of the messaging infrastructure 110a. For example, in a case where the orchestration engine 112a is executing a plurality of instances of the process model 106a, the message handler 118a may be responsible for sending messages of the various instances to the appropriate recipients, using appropriate transmission techniques and/or protocols. Conversely, for incoming messages, the message handler 118a may be used to sort and/or route messages to appropriate portions of the messaging infrastructure 110a, the service 108a, and/or the business application 104a. The message handler 118a also may serve as a buffer or queue for incoming and outgoing, messages.

In the latter regard, for example, the message handler 118a may serve as a queue for incoming messages, which may ultimately be forwarded to the message repository 116a. The message repository 116a may thus be used (perhaps using, or in conjunction with, a corresponding message log) to track and persist each incoming (and outgoing) message(s). For example, for an incoming message, the transaction resource engine 114a may be used to analyze a message header or other message control data and thereby to track an identifier of the process instance, a date/time stamp, or other identifier (e.g., an identifier assigned by the recipient messaging infrastructures 110b). Then, for example and as described in more detail below, the message repository 116a may thus be enabled to store the incoming logged message(s) with corresponding message(s) that were initially sent by the service 108a.

During execution of (an instance of) the process model 106a by the orchestration engine 112a, and as referenced above, an exception in a task of the process model 106a may occur. For example, in addition to other examples mentioned herein, such exceptions may include system (e.g., network) failures, application or database failures, or business level (including human) errors. In FIG. 1, such exceptions may be recognized, detected, or otherwise determined by an exception handler 120a. Although shown separately in FIG. 1 for clarity, it should be, understood that some or all of the exception handler 120a may be executed as part of the orchestration engine 112a. For example, during execution of an instance of the process model 106a, the orchestration engine 112a may find that insufficient information exists to start or complete a given task, and so may indicate an exception for that task.

A number of techniques exist for responding to such an exception. For example, a fault handler (not shown) may be used to assign a severity of the exception, and/or to provide the exception to a higher-level of exception handling (e.g., may send a notice to an administrator of the process model 106a). Further, a compensation handler (also not shown) may be used as a form of post-hoc exception handling, in which a partially-completed task or process is undone (or "rolled back"). Still further, contingencies for the exception may be in place and available to the orchestration engine 112a, so that, for example, the orchestration engine 112a may simply proceed with execution of a contingency task (e.g., as when a manufacturer uses an alternate supplier, shipper, or material).

Additionally, or alternatively, an exception analyzer 122a, which may, for example, be spawned by the exception handler 120a in response to the determination of the exception, may analyze the exception, and results thereof, to determine what further actions may be needed by the messaging infrastructure 110a. For example, it may be readily appreciated that an exception in one task of the process model 106a may affect other tasks of the process model 106a. For example, tasks proceeding in parallel branches may require both branches to proceed/complete (e.g., when manufacturing separate components of a good for sale, for later combination into a composite component).

Further, some exceptions may have interdependencies with other process models, such as, for example, when a task of the process model 106a is affected by an exception and is scheduled for a messaging interaction with the process model 106b (e.g., by way of the messaging infrastructure 110b). For example, as in similar examples above, a manufacturer (using process model 106a) may request shipment of manufactured goods by a distributor (using process model 106b), and may send messages related to such a shipment. The distributor may allocate transportation resources (e.g., may dispatch a delivery vehicle). Subsequently, an exception at the manufacturer (e.g., a dispute with a customer over payment) may cause the manufacturing process to be suspended, so that, unless notified of the exception, the distributor may be caused to allocate transportation resources needlessly.

Thus, the exception analyzer 122a may be configured to analyze the process model 106a, in response to an exception, in order to determine tasks affected by the exception. Of these affected tasks, the exception analyzer 122a may further determine some subset of the affected tasks which may affect (or be affected by) tasks of collaborating process models (e.g., the process model 106b).

One or more of such exception effects may be stored within an exception repository 124a, in conjunction with the originating exception. The exception repository 124a may store a variety of information related to the exception and exception effect(s). For example, the relevant task(s) maybe stored, as well as information about a time or nature of the exception and/or exception effect(s). Information may be stored about possible exception responses, outcomes, or resolutions (e.g., slowing or stopping execution of the process model 106a, or portions thereof, for some amount of time, and/or re-starting execution if the exception is overcome). Further, information may be stored about which collaborating process models (or tasks thereof) should be, or have been, notified about the exception(s), as well as information about how execution of such notifications.

In the latter case, it should be appreciated that a number of techniques exist for notifying the process model 106b about a relevant exception, using the messaging infrastructure 110b which corresponds in the example of FIG. 1 to the messaging infrastructure 110a and thus includes corresponding structures including orchestration engine 112b, transaction resource engine 114b, message repository 116b, message handler 118b, exception handler 120b, exception analyzer 122b, and exception repository 124b. For example, the exception handler 120a may initiate an exception message 126 that includes relevant information about the exception. The exception message 126 may be passed to the message handler 118a for storage in the message repository 116a and for forwarding to the, in this case, messaging infrastructure 110b.

As described herein, the exception message 126 may represent a number of such messages that may be sent to and from the messaging infrastructures 110a, 110b, e.g., to one another, and to other messaging infrastructures (not shown in FIG. 1). That is, there may be numerous collaborating process models with which the process model 106a interacts, and the exception handler 120a and the exception analyzer 122a may be responsible for determining, for each exception, whether the exception relates to one or more of the collaborating process models, and, if so, which of the collaborating process models should be notified, and, even more specifically, which task(s) of the notified, collaborating process models should be identified for notification.

Thus, in the example of FIG. 1, a messaging/correlation token, or label 128, is illustrated that assists in the various determinations just referenced. For example, the label 128 may be used to indicate a messaging dependency between messaging tasks of the various collaborating process models. Although shown as being associated directly with the exception message 126 in FIG. 1, the label 128 may additionally or alternatively be assigned to one or tasks of the process models 106a, 106b (illustrated in more detail in FIG. 2). In this way, escalation of the exception between collaborating process models 106a, 106b may proceed in a straight-forward and reliable manner.

Additional or alternative techniques may be used for correlation of exception message(s) 126 between collaborating process models 106a, 106b. For example, the transaction resource engine 114a may be used to ensure a transactional nature of the exchange of the exception message 126 (e.g., that the exception message 126 is received at the messaging infrastructure 110b, and that a response is ultimately received back at the messaging infrastructure 110a). The message handler 118a also may be used, as described above, to route incoming or out-going instances of the exception message 126 to/from other components of the messaging infrastructure 110a, and the exception message 126 may be stored, similarly to any other message of the messaging infrastructure 110a, within the message repository 116a.

Of course, other messaging techniques also may be used. For example, a publish-subscribe system 130 may be used to provide exception messages, such as the exception message 126. For example, the process model 106b may be responsible for subscribing to messages or other events that are considered to be potentially relevant. Meanwhile, the process model 106a may publish potentially relevant messages or other events to the publish-subscribe system 130. Then, the process models 106a, 106b need not be directly aware of one another, and, instead, the publish-subscribe system 130 may be responsible for routing the exception message 126 in an appropriate manner.

For example, where the process model 106a is associated with a manufacturer of goods, the manufacturer, using the messaging infrastructure 110a, may publish messages related to shipping or otherwise distributing the goods for sale. Then, the publish-subscribe system 130 may, in some example embodiments, examine a header, content, and/or other feature of the published message, and may determine that the message should be forwarded to all shippers, or to some determined subset of shippers. Meanwhile, shippers may subscribe to the publish-subscribe system 130, with the expectation of receiving and filling shipping orders for the manufacturer, or for other manufacturers. Thus, when the manufacturing-related process model 106a experiences an exception, such as a cancelled order from a customer, then the messaging infrastructure 110a may publish the exception message 126 using the publish-subscribe system 130. Shippers, such as one associated with the process model 106b, may subscribe to all shipping-related messages, and may thus receive the exception message 126 from the publish-subscribe system 130.

Thus, the system 100 of FIG. 1 anticipates exceptions in the context of collaborating business processes, and takes into account a potential adverse impact that such exceptions in one business process may have on collaborating business processes. For example, situations may be prevented in which business processes send messages to collaborating processes, make requests of collaborating processes, undertake tasks in anticipation of received messages, or otherwise attempt to advance the work pipeline of any of the collaborating processes, oblivious to exceptions that may have arisen. To the contrary, the system 100 may account for exceptions in a way that increases a reliability and productivity of the collaborating business processes, while minimizing human involvement required to achieve these goals.

Although FIG. 1 illustrates an example in which two essentially identically-structured messaging infrastructures 110a, 110b are used, it should be understood that this is just an example, and that many variations of process models and associated infrastructures, services, applications, and/or human actors, or any combinations thereof, may be used in implementing variations of the system 100. The components of the system 100 may be implemented in appropriate computer hardware, as would be apparent. For example, the orchestration engine 112a and other components of the messaging infrastructure 110a may be implemented using an enterprise application server.

Such an enterprise application server also may be associated with appropriate graphical user interfaces and other design-time tools that allow users to design and implement the process model 106a. Such design-time tools may be used to implement or facilitate some of the above-described techniques, e.g., by including/associating appropriate ones of the message label(s) 128 with corresponding tasks, or (as described in more detail below, with respect to FIG. 9) by building rules for suspending and resuming the execution of the process model 106a into the process model 106a itself, so that such suspensions and resumptions may occur during the normal execution of the orchestration engine 112a, without need to modify the orchestration engine 112a during run-time.

FIGS. 2A-2E are block diagrams of interactions between process models 202-210, respectively, that may be executed by the system of FIG. 1. For example, the process model 202 may represent an example of the process model 106a of FIG. 1, while the process model 204 may represent the process model 106b. In FIGS. 2A-2E, even-numbered reference numerals 212-272 represent tasks of the process models 202-210, while odd-numbered reference numerals 225-249 represent associated message labels for corresponding tasks. Specifically, for example, the process model 202 includes a task 224 having message label "m" 225, a task 226 having message label "o" 227, a task 228 having message label "n" 229, and a task 230 having message label "p" 231. Similarly, the process model 204 includes a task 242 having message label "m" 225, a task 244 having message label "q" 245, a task 246 having message label "n" 229, and a task 248 having message label "r" 249. The process model 206 includes a task 252 having message label "o" 227, and a task 256 having message label "p" 231. The process model 208 includes a task 262 having message label "q" 245, and a task 264 having message label "r" 249. Finally, the process model 210 includes a task 266 having message label "o" 227, and a task 270 having message label "p" 231.

Further, tasks 212, 218, and 234 in the process model 202 are labeled AND tasks (e.g., AND-splits or AND-joins), as is the task 240 in the process model 240. Tasks 220 and 232 in the process model 202 are labeled OR tasks (e.g., OR-split and OR-join, respectively), as is the task 250 in the process model 206 and the task 264 in the process model 210. Inside each process model 202-210, flows (arrows) describe triggers between tasks, where dashed arrows are used to express the fact that further tasks details are not represented. Thus, the various AND tasks and OR tasks connote parallel and alternative branching, such that, as is known, an "AND" task waits for all inputs to arrive and triggers all outputs, while an "OR" task waits for one of its incoming tasks, and (only) one of the outgoing tasks is triggered (for an inclusive OR operation, either or both branches may be triggered, while for an exclusive OR only one branch may be triggered).

The convention is used in the process models 202-210 that tasks which are messaging tasks have either a protruding shape (indicating a messaging task that sends a message) or an indented shape (for a messaging task that receives a message). For example, the task 224 of the process model 202 is a sending task, and task 242 of the process model 204 is a receiving task. In this example, it will be appreciated that each of the tasks 224, 242 are associated with the same message label "m" 225, in order to illustrate and implement appropriate messaging dependencies. That is, as referenced above in FIG. 1 with respect to the message label 128, and as described in more detail below, the corresponding messaging infrastructures (e.g., 110a, 110b) may use the message label 225 to correlate and coordinate transmission of the exception message 126 between appropriate messaging tasks of the process models 202, 204.

In addition to the send/receive pair 224/242 just described, the process model 204 responds to the process model 202 using sending task 246 and receiving task 228 (both associated with the message label "n" 229). Since the send-receive pairs occur in the same branch(es), a request-response style interaction is apparent, where the process model 202 initiated a request, and the process model 204 responds to the request.

Figure 2A:
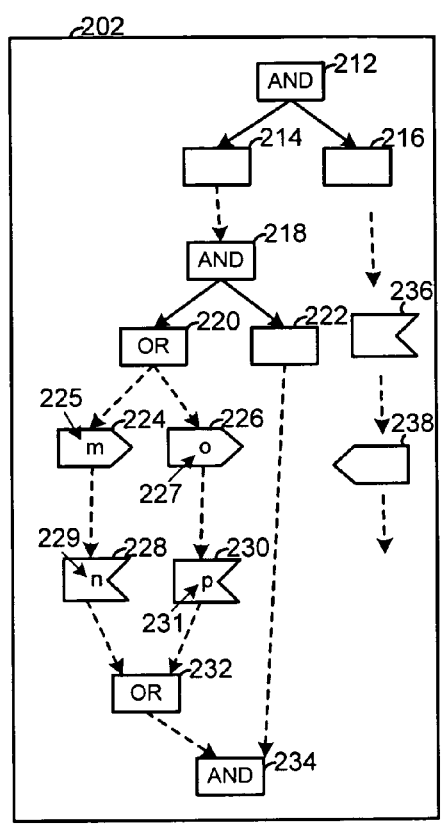
FIGS. 2A-2E are block diagrams of interactions between process models that may be executed by the system of FIG. 1.
Figure 2B:
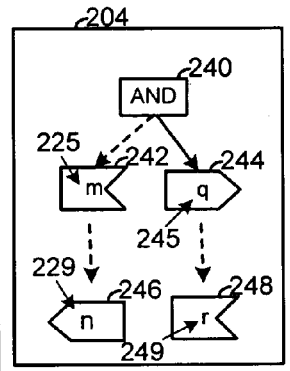
Figure 2C:
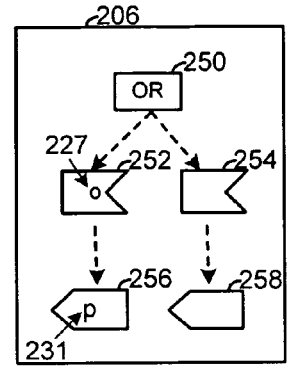
Figure 2D:
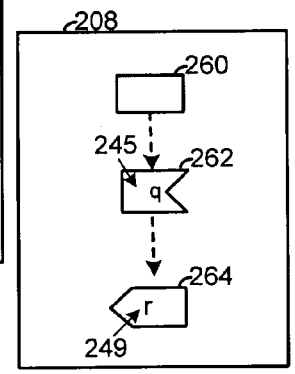
Figure 2E:
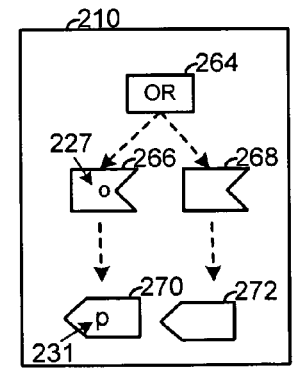

Similarly, it may be observed in FIGS. 2B and 2D that the process model 204 includes the sender task 244 having the message label "q" 245 that sends a message to the receiving task 262 of the process model 208. Other messaging dependencies are illustrated between the process models 202 and 206, and between process models 202 and 210. These messaging dependencies themselves may be interrelated. For example, a related request-response is illustrated between the process models 202, 206, and 210, where a request message of the task 226 having the message label "o" 227 is sent to the task 252 of the process model 206, and where the process model 202 expects a response message from both the process model 206 and 210, as indicated by the message label "p" 231.

Thus, the example messaging interactions of FIGS. 202-210 illustrate request-response interactions implemented through pairs of a plurality of business process models. Of course, other forms of messaging interactions also may be used, such as, for example, send-only or receive-only, or any other known service interaction patterns. As another example (s), constraints may be defined for how many parties must or may respond, e.g., for a multi-cast request-response to be considered successful. It will be appreciated that FIGS. 2A-2E thus merely provide illustrative, non-limiting examples of contexts of the operation of the system 100 of FIG. 1, where such examples may be used to provide the basis for further discussion and illustration of the operations of FIGS. 3-8.

Figure 3:
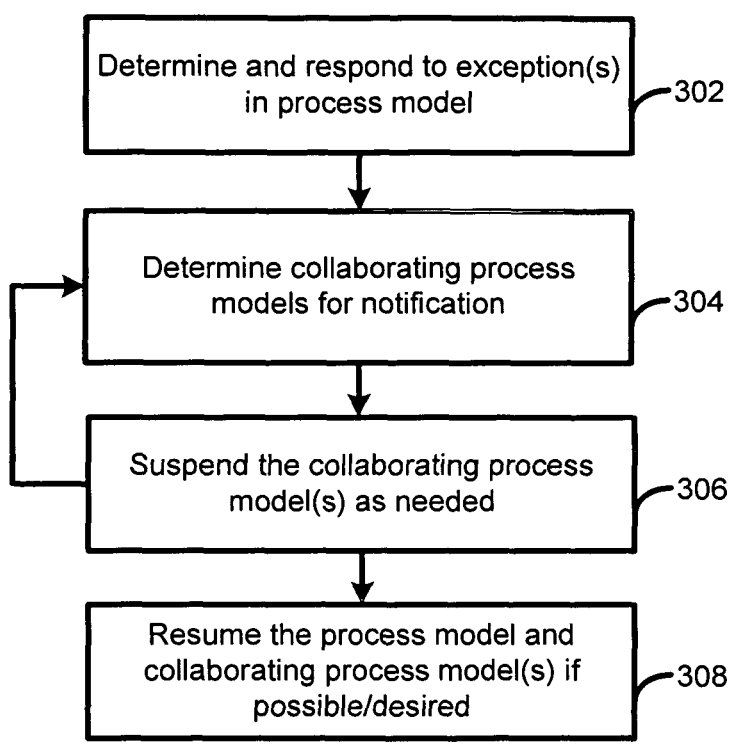
FIG. 3 is a flowchart illustrating an example operation of the system of FIG. 1.

FIG. 3 is a flowchart 300 illustrating an example operation of the system 100 of FIG. 1, with reference to the examples of FIGS. 2A-2E. In FIG. 3, exception(s) are determined in a process model, and are responded to (302). For example, the orchestration engine 112a may determine an exception during execution of a task of the process model 106a, or during execution of a task of the process model 202 of FIG. 2, such as when the task fails to execute. Responses to the determining of the initial exception may include attempting a contingency to the relevant task, or suspending the task. Thus, determining the exception may include determining not only the initial exception, but also may include determining subsequent exceptions that may result from the response(s) to the initial exception.

For example, the process model 202 may be associated with a manufacturing scenario, and the tasks 214 and 216 may each be associated with the beginnings of constructing a component of a manufactured good. The components may then be joined together at a later AND-join operation corresponding to the AND split task 212 of FIG. 2A, in order to form the finished product. If an error occurs in the execution of the task 216, i.e., in the construction of one component, then it may be the case that a task 224 of the process model 202 (associated with the other component) should be suspended. In other words, unless both components will be ready as planned, then resources should not be consumed constructing the other component, particularly when the consumption of the resources includes resources of collaborating process models (as here, where the task 224 is exchanging a message with the task 242 of the process model 204). Consequently, at least the task 224 may be suspended, and also may be considered to experience an exception, as a result of the initial exception of the task 216.

As described with respect to FIG. 1, the orchestration engine 112a may determine the initial exception of the task 216 (e.g., by failing to execute that task). Then, the exception analyzer 122a may be configured to analyze some or all of the process model 202, in order to determine whether other tasks of the process model 202 may be considered to experience an exception. For example, the exception analyzer 122a may scan branches of the process model 202 and apply pre-determined logic, based on a topology or configuration of the process model 202, to locate potential suspensions/exceptions.

Once exceptions of the process model have been determined, and responses thereto have been taken, then collaborating process models may be determined for notification of the exceptions (304). In other words, for example, the exceptions of the process model 202 may be escalated to all relevant collaborating process models. In the example just given, for instance, the messaging infrastructure 110a may determine that the process model 204 (e.g., by way of the messaging infrastructure 110b) should be notified of the exception in the task 224, because the task 242 of the process model 204 is configured to wait for (and thus depend on) a message (having message label "m" 225) from the task 224. Of course, more than one such exception may be escalated; e.g., a similar exception in the task 226 may cause an exception message 126 to be sent to the process model 210, or, more specifically, to the receiving task 266 that waits for a message having message label "o" 227 from the sending task 226.

As explained above, the exception handler 120a may be configured to create or otherwise initiate the exception message(s) 126. The exception message(s) 126 may be stored in the exception repository 124a (along with any relevant/desired information about the associated exception(s)), and may be distributed using the message handler 118a.

The collaborating process model(s) may then be suspended, as needed (306). For example, if the process model 204 experiences an exception in the task 242 due to non-receipt of a message from the task 224 of the process model 202, then the task 244 also may experience an exception and be suspended (for similar reasons described above, i.e., allowing the task 244 to progress along its subsequent branch, while the task 242 is suspended, may cause deadlock at a later AND-join operation associated with the AND-split task 240).

Suspension of the collaborating process model(s) may be executed using corresponding messaging infrastructures thereof, e.g., the messaging infrastructure 110b of FIG. 1. That is, for example, the orchestration engine 112b may suspend appropriate tasks/branches. The exception analyzer 122b may scan branches of its associated process model, and apply suspension logic to determine which tasks/branches should be suspended, whereupon corresponding operations also may occur (e.g., creation of an exception message by the exception handler 120b for storage in the exception repository 124b and sending by the message handler 118b).

Thus, as illustrated by the arrow between operations (306) and (304) of FIG. 3, the process 300 may be recursive, since exceptions in any process model may be escalated to other, collaborating process models, whereupon suspensions and exceptions may occur in the collaborating process models, which may themselves then be escalated. For example, and continuing the above examples, suspension of the task 244 of the process model 204 may require escalation to the process model 208, in which the receiving task 262 waits for a message from the sending task 244. As will be further appreciated, such exceptions/suspensions of collaborating process models may even lead back to further suspensions/exceptions in the originating process model, where the initial exception occurred, so that further suspensions/exceptions in other branches of the originating process model also may occur.

When all iterations of escalations/suspensions/exceptions have occurred, or when otherwise feasible, the process model and collaborating process model(s) may be resumed, if possible and/or desired (308). For example, it may occur that the component associated with the task 216 may resume manufacture, whereupon the currently-suspended task(s) following the task 214 may be resumed. Of course, such resumption results in notification to the collaborating process models, which may themselves resume operation.

In practice, the exception handler 120a may determine resolution of the originating exception, match the resolution with the exception as stored in the exception repository 124a, and then notify the orchestration engine 112a to resume operation. Meanwhile, the exception handler 120a also may notify the message handler 118a to send out all necessary messages to collaborating process models, for which associated exception handlers may perform the same or similar functions as just described. Of course, resumption of the process models may not be possible or desired, depending on circumstance, whereupon an abort of some or all of any relevant process models may be caused to occur.

Figure 4:
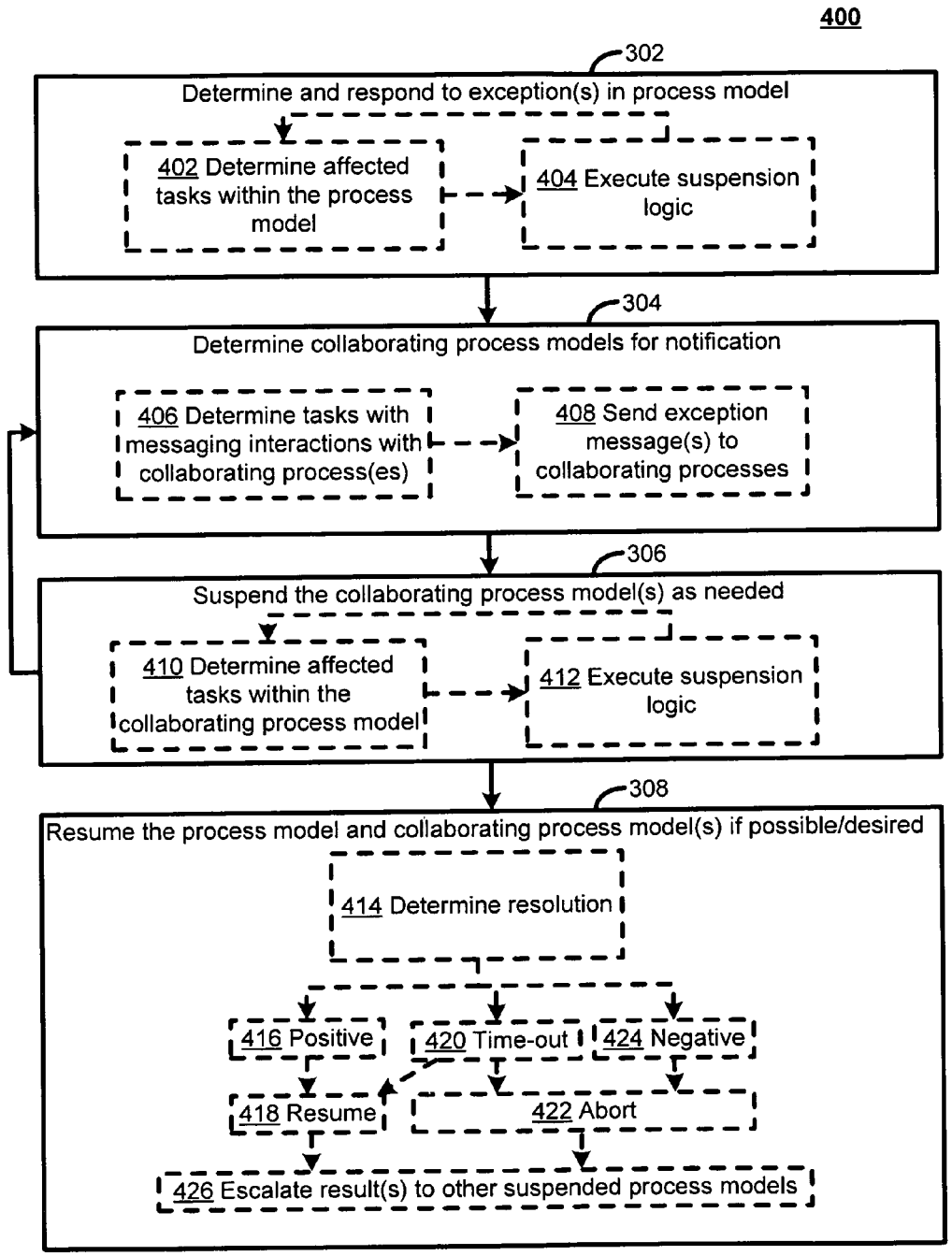
FIG. 4 is a flowchart illustrating additional or alternative example implementations of the flowchart of FIG. 3.

FIG. 4 is a flowchart 400 illustrating additional or alternative implementations of the flowchart 300 of FIG. 3. Specifically, FIG. 4 provides additional/alternative details and examples for each of the operations described above with respect to FIG. 3.

For example, as shown, determining and responding to exceptions in a process model may include determining affected tasks within the process model (402), as well as execution of associated suspension logic (404), and these operations may be recursive until all exceptions within the process model have been identified and dealt with. In other words, affected tasks of the process model may be determined and suspended; these suspensions give rise to further exceptions, and thus further suspensions, until no more exceptions are found.

Then, in determining collaborating process models for notification, tasks within the process model having messaging interactions or dependencies with collaborating process models may be determined (406). Corresponding exception messages may then be sent to the collaborating process models (408).

In these example implementations, it is reasoned that messaging tasks (e.g., send or receive tasks) give rise to exceptions in the collaborating process models; however, is not always the case. For example, it may occur that a send task of the process model sends a message that actually instantiates the collaborating process model, so that it would not be necessary to send the exception message (indeed, if the collaborating process model does not yet exist, then it may not be possible to send the exception message). In other cases, it may occur that results of a messaging task are only optional for a collaborating process model to use, e.g., may not be absolutely required, or contingencies/alternatives may exist.

Thus, additional logic or techniques may be employed to determine which collaborating process models should be notified. For example, in one implementation, an optimization may be considered in which messaging tasks subsequent to an exception are found. Then, each such messaging task is analyzed to determine whether it relates to an interaction prior to the exception. For example, a send task prior to an exception may be related to a receive task after the exception, so that it may be more clear that the receive task should be suspended, and its associated send task in a collaborating process model also should be notified and suspended. Similarly, a send task after the exception may be related to a send task or a receive task before the exception, and a receive task after the exception may be related to a receive task before the exception. In such cases, the exception analyzer 122a may backtrack through the process model in question to determine which are the related interactions for the interactions determined subsequent to the exception.

Even so, it may be the case that the collaborating process model(s) in such scenarios need not require notification, since, for example, the collaborating process model already may have received notification from some other collaborating process model, and/or may have received data allowing the notified collaborating process model to collaborate the incoming message from the process model with the original exception. In other words, it is difficult to determine with certainty which collaborating process models should be notified, and so it may generally be necessary or helpful to leave some of the burden on the receiving process models to determine whether the exception message is relevant. In an extreme case, all collaborating process models may be notified, although this technique may be inefficient and may compromise privacy undesirably.

As exception messages are received at the collaborating process models, then, those collaborating process models may be suspended, as needed, which may include determining affected tasks within the collaborating process model(s) (410), and then executing corresponding suspension logic (412). In other words, as referenced above, these operations mirror the operations within the initial process model, and, as such, may give rise to a need to determine yet further collaborating process models for notification. This process may continue recursively until all parts of all collaborating process models are suspended. Example details of the suspension logic are provided in more detail, below, with respect to FIG. 5.

Finally in FIG. 4, in resuming the process model(s), each suspended process may wait for an outcome of the exception that resulted in its suspension, so that a resolution may be determined (414). A positive outcome (416) results when resolution occurs and the source exceptional task resumes (418).

A time-out condition (420) also may be assigned. In this case, expiration of the time-out period may result either in an attempt to resume (418) the process model, or to abort (422) some or all of the process model. After some number of unsuccessful time-out periods (i.e., when the process model resumes but then experiences another exception), or when some other negative outcome (424) is experienced, then some or all of the process model may abort.

Whichever result occurs may be escalated to the other suspended processes (426), e.g., starting from the original exceptional process and recursively notifying its suspended collaborating processes. If the outcome of the exception resolution was positive (416), then for each suspended process, if the suspended parts are in a state to be resumed, (e.g., have not been aborted in the mean time due to time-out), the suspended parts of each process are re-activated. If the outcome of the exception resolution was negative (424), then for each suspended process, if the suspended parts are in a suspended state (e.g., have not been aborted due to time-out), then the suspended parts of each process are aborted.

Figure 5:
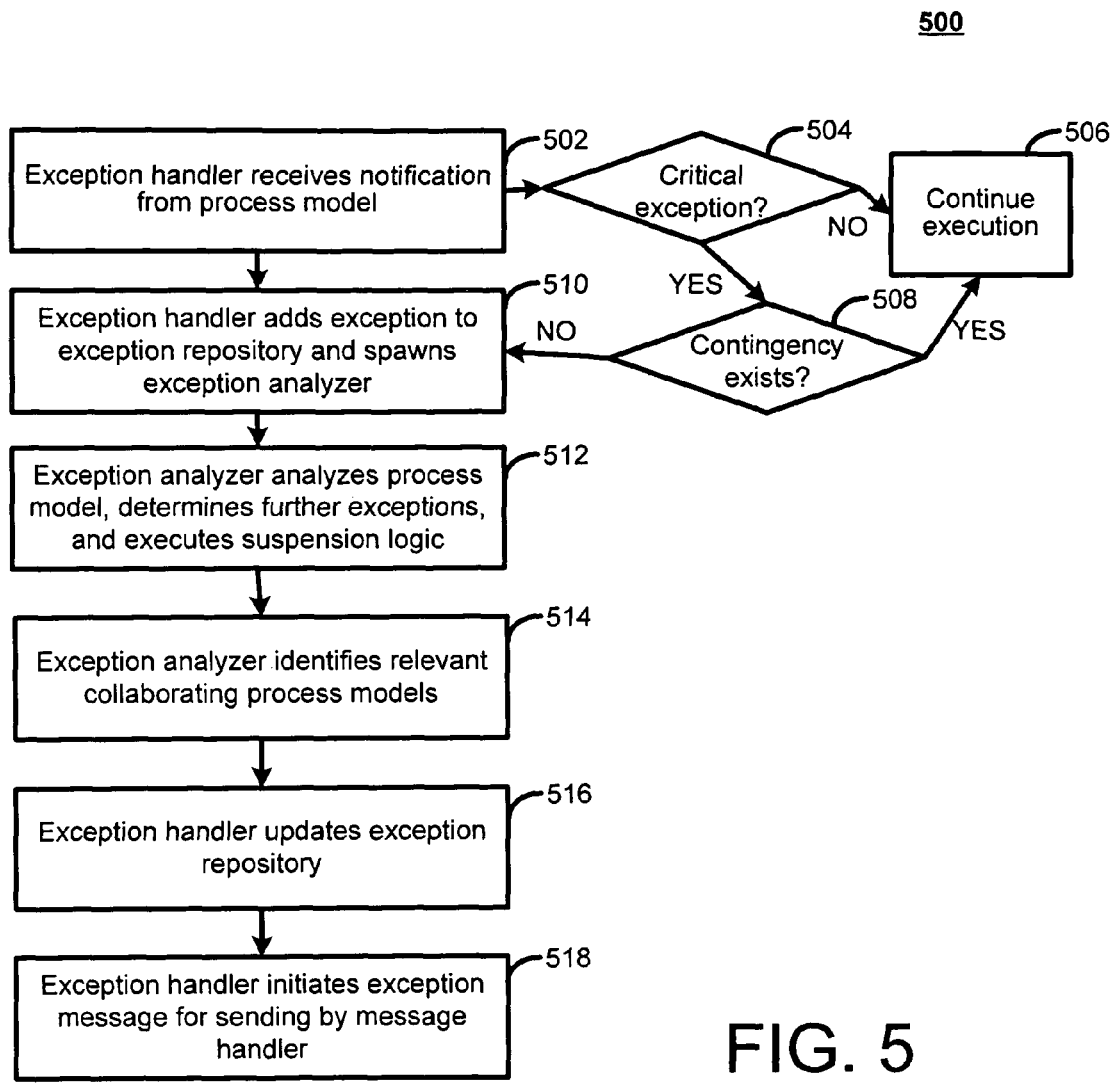
FIG. 5 is a first flowchart 500 illustrating more detailed examples of the techniques of FIGS. 3 and 4.

FIG. 5 is a first flowchart 500 illustrating more detailed examples of the techniques of FIGS. 3 and 4. In the example of FIG. 5, the exception handler 120*a* receives a notification of an exception (502), e.g., from the process model 106*a*. If the exception handler 120*a* determines that the exception is not critical (504), then the orchestration engine 112*a* may continue execution of the process model (506). For example, if the exception occurs in a branch following an inclusive OR-split task, and no messaging tasks are involved in the branch, then the orchestration engine 112*a* may simply continue with execution of the alternative branch of the OR-split task. On the other hand, the exception may be judged to be critical (504), in which case the orchestration engine 112*a* may attempt to execute a contingency to the relevant task(s), if such a contingency exists (508).

Many implementations of these operations exist. For example, the exception handler 120*a* may implement an algorithm to translate a specific example into one of a number of pre-designated threat levels. Such threat levels may be used to determine a critical nature of the exception, including whether it is necessary to escalate the exception to collaborating process models.

If no contingency exists to a critical exception, then the exception handler 120*a* may add the exception to the exception repository 124*a* and spawn the exception analyzer 122*a* (510). For example, the exception analyzer 122*a* may represent a software agent configured to scan a designated process model and to perform an analysis at each task thereof, and/or perform a composite analysis after scanning past a certain number or type of task(s).

Specifically, the exception analyzer 122*a* may be configured to analyze the process model, determine additional exceptions therein, and execute suspension logic for determining whether and how to suspend portions of the process model (512). As referenced above, such suspension logic may include various rules or algorithms for determining whether and how to cause the suspension(s).

In general, and as also referenced above, determining additional relevant exceptions may correspond to relating parts of the process model to a messaging event(s). That is, external/messaging tasks or interactions of the process model may be used by the exception analyzer 122*a* as keys to determining which parts of the process model are affected by the exception. For example, when an exception notification is escalated from the process model to a collaborating process model, the message interactions/tasks in the collaborating process model, which may be dependent on the original process model, may be determined (e.g., messages sent to, and messages received from, the initiating process model).

Thus, in example implementations of such suspension logic, each branch directly containing a message (interaction) task will be suspended. This means that the first active or initiated task in that branch may be suspended.

If a branch is triggered from a parallel split point (otherwise known as an AND split), other branches which are also triggered by the parallel split point may be suspended. This logic is based on the idea that branches conducted in parallel from an original point may likely be related (in the sense of business semantics). If there is a messaging interaction in one of the branches, all branches also undertaken in parallel through a common split point are considered related, and therefore all need to be suspended. Further, such parallel branches may well be synchronized downstream, and therefore delay and possibly deadlock of a synchronization join point (an AND join or "n-out-of m join:) of these branches may occur, if the message interaction branch is suspended while the others are not. Such suspension logic was referenced and illustrated above with respect to the discussion of a possible exception occurring in the task 216 (or 214) of the process model 202.

If a branch is triggered by an exclusive choice split point (otherwise known as an exclusive-OR split or decision), then only the branch containing the messaging interaction is suspended. The logic assumes that choice of branches may not be necessarily related in the business sense, nor will these branches necessarily be strictly synchronized (e.g., through an AND join) downstream (if the branches following an exclusive choice were to converge at a strict synchronization point, then that point would deadlock since, by definition, only one branch will be taken). For example, it may occur that transportation of a good for sale between two sites may occur by truck(s) or by train(s), but not by both (thus representing an exclusive OR split). If the train delivery branch requires external messaging (e.g., to coordinate other train schedules), then that branch may be suspended, while the truck delivery branch may continue.

If a branch is triggered by an inclusive choice split point (otherwise known as an inclusive-OR split or multi-choice decision), then all triggered branches are suspended. The suspension logic assumes that since more than one branch may be executed, the branches are likely to be related, and therefore should both/all be suspended. Another line of reasoning supporting this logic is that an inclusive choice of branches may well be partially synchronized downstream (e.g., through a synchronization/merge construct, which enforces a synchronization if more than one branch which is input to it has been activated, and performs a merge if only one branch has been activated). Thus, even though deadlock will not occur as a result of a suspended branch, the mere fact that some synchronization is allowed, may be assumed somehow to relate the branches.

Further in the example suspension logic, if the branch in question is triggered by a deferred choice (a known workflow pattern which allows the first of the succeeding tasks that requests execution to execute, while causing the other succeeding tasks not to execute), then only that branch is suspended. In other words, the rule for a deferred choice may be the same as just described for an exclusive choice; that is, a similar logic may apply, since, again, only one branch is triggered.

Process initialization and finalization may have different split and join semantics to start and terminate a process model. For example, a process model may be initialized with two tasks started, or with a choice of either one. Further, the process model may end with two tasks needing to be completed, or (only) either one. Thus, rules applying to suspending branches related to the initialization and completion of a process model may be covered by the above-described logic for splits and joins.

If the suspension logic indicates suspension for a task, and the task is decomposed into further tasks (i.e., is a nested task), then corresponding rules for suspension may be applied to the decomposed structure. The suspension logic also may indicate that if a branch is suspended, all instances of the branch should be suspended, since multiple instances of branches typically arise from iterative structures in the process model (e.g., loops or recursion).

The above examples merely represent non-limiting examples of suspension logic. Many other rules/algorithms may be applied, depending on, for example, a context or type of the process model, or an extent to which a designer wishes to risk inefficiencies in resource allocation.

The exception analyzer 122*a* may then identify relevant collaborating process models (514). As referenced above, example implementations contemplate determining all external messaging interactions which are impacted by the exception. More specifically, when an exception occurs on a task, the external messaging interactions may be determined from the execution branch(es) after the task. Such messaging interactions may include, for example, message send, message send/receive, message receive, and message receive/send.

In example implementations, the exception analyzer 122*a* may determine all interactions, whether or not the interactions would have been executed. For example, an exclusive choice (or decision) node involves two or more branches, not all of which may be executed. If interactions exist in all of these tasks, then not all are invoked, since only one branch may be taken. However, for the purposes of notifying collaborating process models, all interactions may be collected, since the exact branches selected downstream are not known in advance.

When examining a message interaction, it may be difficult for the exception analyzer 122*a* to determine to which collaborating process model the interaction relates (and, more specifically, which task inside that process is related). Thus, as referenced above, message labels may be provided at design time of the process model(s) to provide information about which sending and receiving tasks are related to one another.

That is, at run-time a message typically contains sufficient information to identify a receiving task of the message. Further, through design-time models, a correlation may be indicated through the message labels described above, e.g., with respect to FIGS. 2A-2E. Thus, a sender in one process and a receiver in another share a message label (an annotation), such as the message labels 225, 227, 229, or 230 in FIG. 2A, which signifies their correlation. In additional or alternative implementations, the publish-subscribe system 130 may be used to create a channel/subscription between relevant process models.

Having identified relevant exceptions, suspensions, and collaborating process models, the exception handler 120*a* may update the exception repository accordingly (516). For example, an exception record may be created that includes an exception effect (e.g., one or more suspensions), an identification of notified collaborating process models, an expectation of whether and when to hear back from the notified collaborating process models, and a required/expected/possible exception outcome. Similarly to the message repository 116*a*, such exception records may be constructed using the eXtensible Mark-up Language (XML), according to message type/template information provided in corresponding XML schemas.

Finally in FIG. 5, the exception handler 120*a* may initiate an exception message (e.g., the exception message 126) for sending by the message handler 118*a*. As described, the exception message 126 may identify or include the message label 128, and may be logged within the message repository 116*a*, as would be any other message sent by the messaging infrastructure 110*a*.

Figure 6:
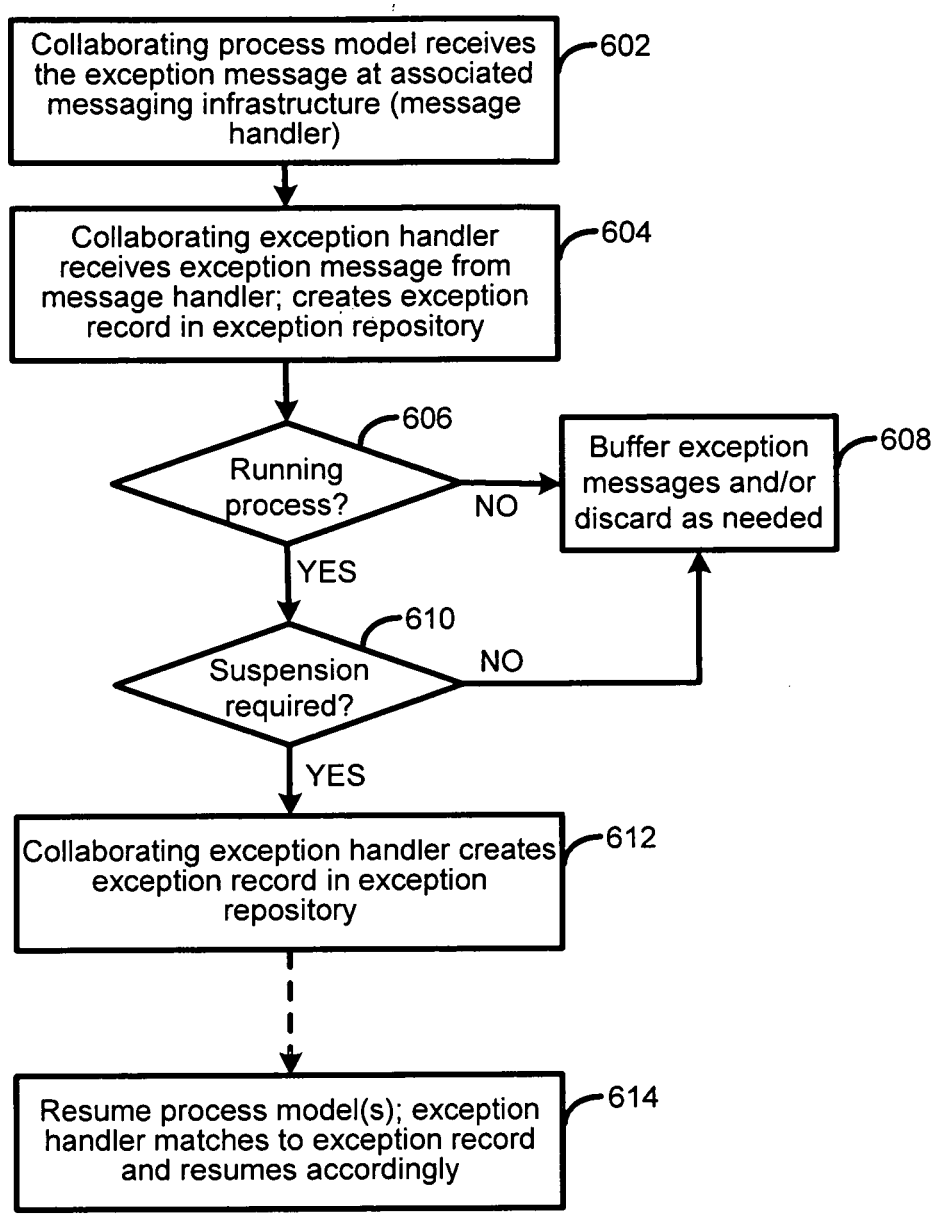
FIG. 6 is a second flowchart 600 illustrating more detailed examples of the techniques of FIGS. 3 and 4.

FIG. 6 is a second flowchart illustrating more detailed examples of the techniques of FIGS. 3 and 4. In FIG. 6, the operations continue at a side of the receiving (collaborating) process model, e.g., when the collaborating process model receives the exception message at its associated messaging infrastructure (602). That is, for example, the message handler 118*b* may receive the exception message 126 and log the exception message 126 in the message repository 116*b*.

The exception handler 120*b* may then receive the exception message 126 from the message handler 118*b* (604). The exception handler 120*b* may perform an initial analysis of the exception message 126, e.g., to determine a corresponding message label or make other preliminary conclusions. In the example of FIG. 6, it is assumed, in line with the above discussion, that the messaging infrastructure 110*a* errs on the side of sending too many, rather than too few, exception messages. For example, exception messages may be sent for all messaging tasks/interactions to all (relevant) collaborating process models. Consequently, the collaborating process models may well receive exception messages that either are simply not relevant thereto, or that may be relevant but may have no practical consequence (e.g., may not require suspension of any part of the receiving, collaborating process model). In other words, such examples assume that dealing with exception messages is at least partly an implementation matter on the receiving side.

Thus, in FIG. 6, the exception handler 120*b* may first determine whether the exception message relates to a running process model (606). If no running process is related, then the exception message 126 may simply be buffered (608). If, at a later time, the originating exception is resolved, then the exception handler 120*b* may receive a corresponding resolution message, and may discard the exception message 126 from the buffer. That is, for example, an exception may arise and be resolved before a collaborating process model affected by the exception is even instantiated. As another example, the collaborating process model may currently be suspended for separate, independent reasons, so that, again, the question of whether to suspend the collaborating process model is moot.

If the process model is running (606), then the exception handler 120*b* and/or the exception analyzer 122*b* may determine whether suspension is required (610). If not, then again the exception message 126 may be buffered, and, potentially discarded (608). Of course, as in the examples just given, it will be appreciated that the exception message 126 may be pulled from the buffer if the exception handler 120b determines that the exception message 126 may have become relevant (e.g., if the related process model begins to execute).

If suspension is required, then the exception handler 120b may create an exception record in the exception repository 124b (612). Further operations of the exception analyzer 122b may proceed; however, such operations are analogous to the operations (510-518) of FIG. 5 for the originating process model, and so are not illustrated in FIG. 6, or discussed again here, in detail, but are merely represented by the dashed line following operation 612 of FIG. 6.

Finally in FIG. 6, it is assumed that resumption of the collaborating process model(s) may occur (614). As referenced above with respect to FIG. 4, such resumption may occur initially with the original exception/process model, and may be propagated to the collaborating process models.

For example, the process model 106a may come back on-line and be detected by the orchestration engine 112a, which may notify the exception handler 120a. The exception handler 120a may then retrieve the corresponding exception record from the exception repository 124a to determine appropriate action. Such action may include, for example, resuming the process model 106a, as well as determining which collaborating process models were notified, for subsequent notification thereof of the resolution of the exception (e.g., by sending an appropriate message using the message handler 118a). Of course, similar comments would then apply at the messaging infrastructure 110b, and at all other affected, collaborating process models.

Many other details and examples associated with the example of FIG. 6 may be implemented, even if not discussed explicitly above. For example, FIG. 5 illustrates the contemplation of contingency tasks, rather than simply suspending an exceptional task, and similar techniques may be used in FIG. 6. In all such cases, however, it may be appreciated that execution of such contingencies should not leave collaborating processes dependent on the contingent task for an expected message interaction. In other words, by moving on to a contingent task, the collaborating process model may no longer need or require the originating process model, so that the originating process model may be left waiting indefinitely, even in a scenario where the exception of the originating process model is resolved. Details of whether, how, and when such contingent tasks may be implemented (or prevented) may thus be incorporated into the global process model 102.

In some situations, contingent tasks may simply be prevented, such as when the contingent task would be dependent on a suspended part of the originating process model. For example, a first branch of which the contingent task is a part may be synchronized with a second branch, where the second branch may have been suspended. In such a case, it would not be beneficial or useful to execute the contingency, since proceeding along the first branch using the contingent task still would result in a deadlock situation.

Figure 7:
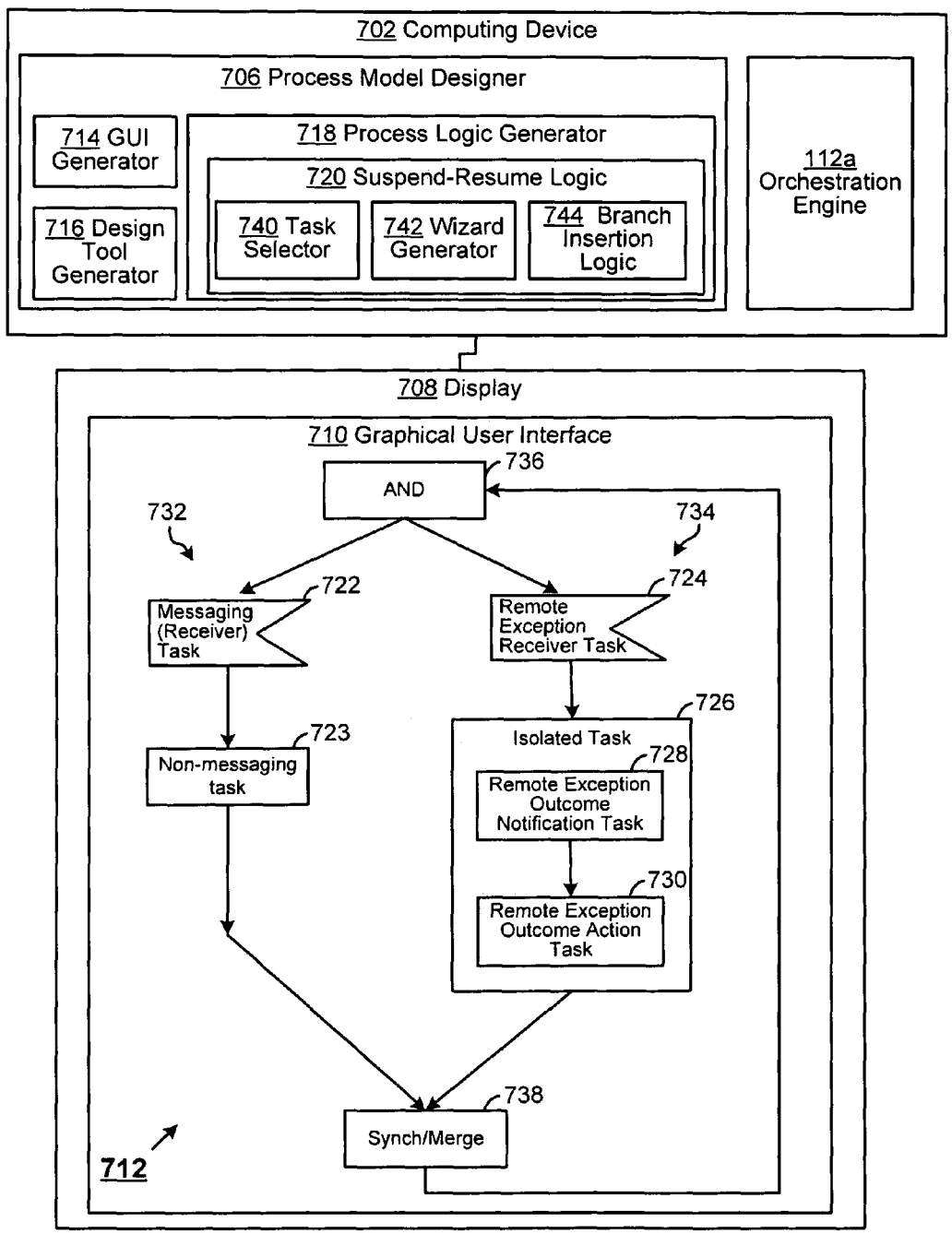
FIG. 7 is a block diagram of an isolated task structure that may be executed in order to suspend a process model in response to an exception.

FIG. 7 is a block diagram of an isolated task structure that may be executed in order to suspend a process model in response to an exception. That is, for example, FIGS. 3 and 4 explicitly illustrate and describe that an originating and collaborating process model(s) may need to be suspended, and, when the exception(s) is resolved, may need to be resumed. In various implementations, such suspensions and resumptions may be executed by the orchestration engines 112a, 112b during run-time.

In the example implementations of FIG. 7, however, examples are provided in which the mechanics of suspension and resumption are built into the process model(s) at design time. More specifically, the process models may be designed to include the possibility of suspending one or more specified tasks thereof, so that the suspension may later occur as a normal part of execution of the process model. In other words, actions taken during design-time with regard to constructing the process model may be reflected during run-time, so that execution during run-time may proceed without requiring any external modification or manipulation of the executing process.

In FIG. 7, then, one or more computing device(s) 702 is/are used to implement the orchestration engine 112a. The computing device 702 may represent, for example, virtually any computing device having sufficient memory, processing power, and networking ability to execute workflow model design and implementation. Specifically, the computing device 702 may include an enterprise application server that is configured to implement the orchestration engine 112a.

The computing device 702 is also configured to implement a process model designer 706. The process model designer 706 may include software running on the computing device 702 that allows a human designer of the process model(s) to design a process model in a convenient manner, without requiring much, if any, programming knowledge on the part of the human designer.

For example, the process model designer 706 may interact with a display 708 to provide a graphical user interface (GUI) 710, so that the designer may design a process model simply by selecting (e.g., dragging-and-dropping) from a toolkit of provided tools and/or templates. For example, the process model designer 706 may provide, using the GUI 710, various graphical elements (e.g., blocks, shapes, arrows, or pointers) that represent various elements of process models. Such elements of process models may include, for example, workflow tasks and associated control tasks for directing a flow of the workflow tasks (where such control tasks may include, for example, forks/splits and associated joins, or pointers to provide a loop or iteration of the process model, or other known elements of process model design). Accordingly, the designer may easily select desired graphical elements, arrange the graphical elements in a desired order, and assign the graphical elements a desired function(s).

In general, various details and variations of such graphical design of process model(s) are known. Further, as will be appreciated, the display 708 may represent virtually any display suitable for interacting with the computing device 702, while the GUI 710 may represent virtually any suitable GUI, such as, for example, a browser that provides the designer with access to the process model designer 706 over a network (e.g., the Internet, or a corporate Intranet).

In FIG. 7, the process model designer 706 is illustrated as being used to design a suspension block 712 that is a portion of a designed process model (e.g., the process model 106a, or the process model 202). The suspension block 712 may be designed during design-time so that a suspension and resumption of some or all of the larger process model 106a or 202 (of which the suspension block 712 is a part) may occur during run-time as a normal part of execution thereof by the orchestration engine 112a. In other words, for example, the suspension block 712 is designed to anticipate that an exception (e.g., hardware, software, or human error) may occur during execution of the process model by the orchestration engine 112a, so that the exception is handled as a normal part of the execution, without modification or manipulation of the orchestration engine 112a during run-time.

In more detail, then, the process model designer 706 may include a GUI generator 714 that is configured to generate or provide the GUI 710. For example, when the GUI 710 includes a browser, the GUI generator 714 may be configured to execute general browser control and/or browser logic. For example, browser controls may generally represent controls that are not specific to any particular page or other content currently being displayed such as, for example, a menu bar, a tool bar, a back button, a forward button, and other common buttons and other controls typically associated with browser usage. Meanwhile, browser logic generally represents software that controls a manner in which the GUI 710 operates and responds to the browser controls just described, and may be responsible, for example, for opening new pages, creating new windows, applying user preferences, or any other task that may be initiated by the designer during process model design. The GUI generator 714 may operate locally to the designer, or may operate in whole or in part at a remote location, e.g., may run on a remote server.

The process model designer 706 also may include a design tool generator 716. As referenced above, such design tools may include various boxes or other shapes, as well as arrows, pointers, or other control elements, that the designer may use to construct a desired process model. Thus, the design tool generator 716 may be configured to provide such graphical elements, and to enforce the necessary properties thereof (e.g., may prevent certain elements from being joined if impermissible, or may automatically generate a secondary element that is required when a particular primary element is selected or used). As will be appreciated, the design tool generator 716 may be implemented as a part of the GUI generator 714, but is shown separately in FIG. 7 for clarity and convenience.

The process model designer 706 also includes a process logic generator 718, which is configured to enforce certain rules on the process model being designed. That is, whereas the design tool generator 716 is associated with graphical elements that are generic to virtually any process model being designed, the process logic generator 718 may generally be associated with logic that is specific to the particular process model being designed, or to a class of process models. For example, if the process model being designed relates to a sales scenario in which (a) orders are received, (b) products are obtained, and (c) shipment occurs, then the process logic generator 718 may ensure that no shipment is scheduled before an associated product is actually obtained (e.g., received in a warehouse for packaging). In this example, such rules may be enforced across a wide range of order/shipping scenarios, while in other scenarios, rules may be very specific to a particular situation.

It should be understood that the process model designer 706 is intended merely to represent and illustrate examples of certain aspects and features that may be relevant to the present description. Of course, many other process model design techniques may additionally or alternatively be used, and many other implementations are contemplated. For example, the process model designer 706 may be implemented as part of the orchestration engine 112*a*, and the process logic generator 718 may be part of, or in communication with, one or more business applications (not shown) that provide, or are associated with, the logic enforced by the process logic generator 718.

In FIG. 7, the process logic generator 718 includes suspend-resume logic 720. As referenced above, and described in more detail below, the suspend-resume logic 720 may be configured to modify a process model being designed to ensure that the designed process model may be suspended during later execution thereof by the orchestration engine 112*a*, as needed and without requiring human intervention and/or modification/manipulation of the orchestration engine 112*a*.

The suspend-resume logic 720 also may be configured to interact with the designer to obtain and implement desired characteristics of the suspension and/or resumption. For example, the suspend-resume logic 720 may obtain information from the designer (perhaps using an interactive wizard) regarding potential causes of the suspension, as well as regarding potential causes of the resumption.

In this way, for example, the designer may design the process model(s) 106*a*, 202 that anticipates that certain errors or other exceptions may occur, and that includes built-in responses to such exceptions. For example, the designer may design the process model 106*a* that anticipates that an anticipated message (e.g., from a collaborating business partner) may not be received, so that execution of the process model may be suspended until the message is received (whereupon resumption of the process may occur). Such suspensions and resumptions may be designed to occur without disrupting or halting other parts of the larger process model(s) 106*a* that should be allowed to continue (i.e., that are not directly affected by the exception).

In operation, then, it may occur that the designer designs a process model that includes a messaging task 722, or, more specifically, a receiving task (as illustrated by the indented nature of the block 722 in FIG. 7). Of course, many other tasks may be included, represented in FIG. 7 by a single, non-messaging task 723.

It may be anticipated (e.g., either by the designer or the suspend-resume logic 720) that an exception associated with the receiving task 722 may occur during later execution of the process model 106*a* by the orchestration engine 112*a*. For example, the task 722 may include receipt of a message that informs the larger process model that a business partner has received shipment of a product at a warehouse, so that shipment of the product to the customer may proceed, and/or payment may be collected.

In these and other examples, the designer may be allowed to insert at least one suspension task, in parallel with the task 722 and forming a parallel combination thereof. In FIG. 7, the at least one suspension task may include, for example, one or more of the tasks 724, 726, 728, and 730. In particular, the task 724 includes an exception detection task that is illustrated as a remote exception receiver task 724 that allows the designer to designate possible events or causes that may be detected during run-time of the process model and that may be interpreted as triggering exceptions. More specifically, the remote exception receiver task 724 may be configured and characterized to receive the exception message 126 from a remote, collaborating process model (e.g., from a messaging infrastructure thereof) as to an exception that occurs in the execution of the remote process model. For example, if the remote process model is associated with taking and processing orders for products to be manufactured, then the remote exception receiver task 724 may receive any one of a number of exception messages that provide some information about a corresponding exception that may have occurred (although only the single remote exception receiver task 724 is illustrated in the example of FIG. 7), and that informs that the messaging task 722 will not, or may not, receive its expected message at the expected time.

The task 726 refers to an isolated task 726 that is triggered when the exception detection task, e.g., the remote exception receiver task 724, is completed. The isolated task 726 has a characteristic of continuing to completion once triggered, without permitting any interleaving with other tasks. In other words, the isolated task 726 may be considered to represent an atomic task that is configured to prevent execution of any other task that may occur before the isolated task 726 finishes.

In the example of FIG. 7, for example, if the isolated task 726 is triggered prior to a beginning of the task 722, then the isolated task 726 is configured to complete before the task 722 is allowed to begin. In FIG. 7, the isolated task 726 includes the task 728 as a remote exception outcome notification task 728, and the task 730 as a remote exception outcome action task 730. Therefore, since the isolated task 726 is configured to complete without any interleaving with other tasks, it may be seen that possible orders of execution of the tasks 722, 723, 728, and 730 only include possible sequences of: (a) 722, 723, 728, 730; (b) 722, 728, 730, 723, (c) 728, 730, 722, 723, but do not include the possible sequence of, for example, 728, 722, 730, 723 (since this would mean that the task 722 is implemented in between the tasks 728 and 730, which is prevented by the configuration of the isolated task 726, as just described). Similar comments apply to other tasks that may precede or follow the tasks 722, 723, not shown in FIG. 7 for clarity, but generally represented by the dashed lines before and after the tasks 722, 723.

The effect of including the isolated task 726 in this manner, then, is to suspend the task 722. That is, when the task 728 is triggered before the task 722, and then the task 728 is paused for whatever reason or by whatever mechanism, then the isolated task 726 may not complete, and the task 722 may not begin. Consequently, the task 722 is effectively suspended. If the isolated task 726 completes (e.g., when the remote exception outcome action task 730 is triggered and completes), then the task 722 may begin, so that the task 722, and relevant portions of the larger process model 106*a*, may resume execution.

In FIG. 7, the tasks 724, 728, and 730 are illustrated as singular tasks. However, it will be appreciated that multiple ones of each of the tasks 724, 728, 730 may be implemented. For example, a range of remote exception receive tasks 724 may be used, corresponding to different types of exceptions and/or exception messages. Somewhat similarly, for the remote exception outcome tasks 728, 730, at least two types of tasks may be used, e.g., one for a positive outcome and one for a negative outcome. For example, a positive outcome may trigger a post-processing task (e.g. logging information) and cause an exit of the isolated task 726, which effectively results in the process model being resumed. A negative outcome also may execute a post-processing task, which may act to throw the exception to the process as a first step of local abort handling. The abort may be escalated through several levels, until the right level of decision-making has reached in order to determine what action (in the extreme, aborting the whole process model).

Thus, above example and FIG. 7 generally illustrate that the suspend-resume logic 720 may be used during design of the process model 106*a* to define a first branch 732, also referred to as a process branch, and a second branch 734, also referred to as a suspension branch and/or suspension-resumption branch. As described, the suspension branch 734 may be designed during normal design of the larger process model 106*a*, and may be activated during execution to control a desired suspension and resumption of at least a part of the process model 106*a* (including the process branch 732) during execution thereof by the orchestration engine 112*a*.

In the example of FIG. 7, as referenced above, the remote exception receiver task 724 may receive the exception message 126, during run-time, that informs that the messaging task 722 will not, or may not, receive its expected message at the expected time. Upon receipt of such an exception message, the isolated task 726 may be activated, so that the remote exception outcome notification task 726 is activated. The remote exception outcome notification task 726 waits for a second message from the originating, remote process model that indicates an outcome of the relevant exception. For example, the remote process model may send a follow-up message that says that a payment has been received (or, conversely, will not be received), or that some other problem with the order has been resolved (or, again conversely, will not be resolved).

Until such a message is received, the orchestration engine 112*a* will not allow the messaging task 722 to execute (i.e., will enforce the property of the isolated task 726 that no tasks of the parallel branch may be interleaved with tasks of the isolated task 726). Consequently, the process branch 732 will be suspended, and the manufacturing entity associated therewith may devote resources to other, more productive and efficient areas.

If and when such a message is received that provides the remote exception outcome notification for the task 726, then the remote exception outcome action task 730 will be triggered. For example, any of the above exception outcome actions may be triggered, such as, for example, a resumption of the messaging task 722 and subsequent task 723, aborting of the messaging task 722, an escalation of the exception to a higher level, or an execution of some contingency (i.e., alternative) task. Then, the orchestration engine 112*a* may synchronize/merge the process branch 132 and suspension branch 134 as described below.

The process branch 732 and the' suspension branch 734 are joined in parallel between a first control task 736 and a second control task 738 that act to enforce and support the behavior described above. In FIG. 7, the first control task includes an AND task 736 (also referred to as an AND-split task), while the second control task includes a synchronization/merge (synch/merge) task 738. The first control task 736 and second control task 738 may be inserted by the suspend-resume logic 720 as part of the process model design. For example, the designer may be in the process of designing the process model, and may decide that the task 722 requires the possibility of being suspended in response to an anticipated exception (e.g., because the task 722 is a messaging/receiver task that interacts with a collaborating process model). The designer may then interact with the suspend-resume logic 720 to provide characteristics of the suspension branch 734, including, for example, remote exception receiver events, remote exception outcome notifications, and/or remote exception outcome actions, as referenced above. Then, the suspend-resume logic 720 may insert the suspension branch 734, along with the control tasks 736, 738 at the beginning and end of the branches 732, 734, as shown, so as to establish a parallel combination thereof.

During later execution of the designed process model (e.g., of an instantiation thereof) by the orchestration engine 112*a*, the AND task 736 will allow both or either branch(es) 732, 734 to activate and execute. If the process branch 732, including task 722, executes as planned, and completes (e.g., no error occurs), then the synch/merge task 738 simply merges the two branches 732, 734 and the process continues. If, however, the task 722 does not execute as planned, and the exception detection task 724 receives (detects) an exception, then the isolated task 726 is activated, and at that point the process branch 732 is not permitted to progress further (i.e., is suspended). Only when the exception outcome action task 730 is completed may the suspension branch 734 complete, which allows the synch/merge control task 738 to synchronize and merge the branches 732, 734 (unless otherwise directed, e.g., where the exception outcome action task 730 causes the entire process to abort).

Thus, the combination of control tasks including the AND task 736 and the synch/merge task 738 provides a combination of a simple synchronization (in which two or more tasks/branches are synchronized such that execution of following tasks may not proceed until all the preceding tasks are completed) and a merge (in which the process model waits for one task/branch among a set to complete before proceeding; in a pure merge, it is generally assumed that only one of these tasks will be executed). The resulting synchronization/merge provides a combination in which multiple tasks/branches are merged, such that multiple tasks/branches are synchronized if more than one of the tasks/branches are actually taken, and a simple merge is performed if only one of the tasks/branches is taken. In this way, for example, a deadlock situation is avoided, e.g., situations in which synchronization is impossible because the process branch 732 executes to completion but the suspension branch 734 is never activated.

Thus, in the example of FIG. 7, if the process branch 732 is activated, but not the suspension branch 734 (such as when the task 722 completes without incident), then a simple merge will occur when the process branch 732 completes. Likewise, if the suspension branch 734 is activated but not the process branch 732, then, again, the merging of both branches 732, 734 may occur. On the other hand, if both branches 732, 734 are activated, then synchronization will occur, so that the process model may not proceed from the second control task 738 until both branches 732, 734 are complete (i.e., until the exception has been resolved and the task 722 has been completed). Consequently, it may be seen that stopping the isolated task 726 (e.g., while waiting on the exception outcome action task 730) in the presence of the control tasks 736, 738 means that the task 722 (which can not be interleaved with the tasks 728, 730) must occur after the isolated task 726 but before synchronization, if the larger process model is ultimately to continue.

In operation, the suspend-resume logic 720 may be configured to perform a number of detailed operations related to the above techniques, and related techniques. For example, the suspend-resume logic 720 may include a task selector 740 that is configured to select the task 722, from among a number of tasks of the larger process model 106a, as a likely or required candidate for requiring inclusion in the suspension block 712. Such selection may occur, for example, immediately upon insertion of a particular (type of) task within the process model being designed, or may occur after the entire process model is designed.

The suspend-resume logic 720 also may include a wizard generator 742 that executes an interactive wizard for eliciting information from the designer related to how the suspension branch 734 should be constructed and executed. For example, the wizard generator 742 may be configured to assist the designer in defining an exception event to be recognized by the exception detection task 724, or defining a notification for the exception outcome notification task 728, or defining an action/response for the exception outcome action task 730.

Finally, the suspend-resume logic 720 may include branch insertion logic 744 that is configured to determine where and how to insert the suspension branch 734 and/or the control tasks 736, 738. For example, as indicated by the dashed lines along the process branch 732, it may be the case that some, many, or no tasks may be included either before or after the task 722. A decision as to whether and which tasks should be included before or after the task 722 may be supported, at least in part, by the branch insertion logic 744. For example, the branch insertion logic 744 may determine that if the task 722 is a messaging task, then all non-messaging tasks occurring before and after the task 722 (up to but not including the nearest prior or subsequent messaging task) should be included in the process branch 732. For example, with reference to the process model 202, where the messaging task 224 may correspond to the messaging task 722 for which an exception is anticipated at design-time, it should be understood that the branch insertion logic 744 may insert the control tasks 736, 738, before/after the task 224, so that the suspension branch 734 is in parallel with the task 224.

Thus, the process logic generator 718 provides for fast, intuitive design of a process model to capture and thus visualize suspend-resume operations, in a manner that anticipates remote exceptions and that is capable of suspending a designated module, portion, or block of the process model until the exception is resolved, and the process resumed. Accordingly, process models are able to provide more complete coverage of their relevant application domains.

Many other variations and implementations are contemplated. For example, it may occur that, as shown in FIG. 7, the suspension block 712 may anticipate a loop-back operation in which allows for the overall suspension block 712 to be re-executed. For example, a remote exception outcome notification/action 730 may include "problem continuing," or some other indication of a non-fatal problem that is on-going. In such cases, the suspension block 712 re-starts/re-activates the AND task 736, and tries again to execute through the process branch 732. In these case, it may be advantageous to deactivate the process branch 732 and cause it to be a dead branch for the synch/merge operation, so as to avoid having two active instances of the process branch 732 (e.g., upon re-starting of the AND task 736). In other implementations, if multiple instances are active, then identifiers may be used to differentiate.

In the examples described, it should be apparent that the suspension block 712 provides a modular, discrete way to implement process suspension/resumption. That is, processes at the level of decomposition of the suspension block 712 may be suspended and resumed, while other parts of the process model as a whole may be allowed to continue, as needed/possible. In some instances, a result may be that multiple suspension blocks 712 may exist within a single process model, and multiple parts of the process model may be suspended at the same time.

That is, for example, multiple remote exception messages may be received. It may occur that a second remote exception message is received, after a suspension has already occurred in response to a first remote exception message. In such cases, the second remote exception message may be buffered in the messaging infrastructure 110a, until the first remote exception message is resolved. Of course, in the meantime, it may occur that the second remote exception is resolved before the associated buffered remote exception message is read, in which case the buffered remote exception message may be discarded.

The implementations of the system described herein generally refer to whole systems for implementing the various techniques. However, it should be appreciated that various modular implementations may exist. For example, the process logic generator 718 and/or the suspend-resume logic 720 may be implemented as third-party components (e.g., constructed in XML) that are included in the process model designer 706 and/or the orchestration engine 112a.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program described above, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Methods also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Thus, while certain features of the described implementations have been illustrated as described herein, many modifications, substitutions, changes and equivalents will now occur to those skilled in the art. It is, therefore, to be understood that the appended claims are intended to cover all such modifications and changes.

What is claimed is:

1. A system including instructions recorded on a computer-readable storage medium and executable by at least one processor, the system comprising:

an orchestration engine configured to cause the at least one processor to determine an exception during an execution of a task of an instance of a first process model, the exception causing the task to at least temporarily fail to execute to completion;

an exception analyzer configured to cause the at least one processor to analyze the instance of the first process model to determine an exception effect, including scanning other tasks of the instance of the first process model to determine a potential impact of the exception thereon for inclusion within the exception effect, wherein the scanning includes identifying tasks of the other tasks which are potentially affected and which are configured to send a message to an executing instance of a second process model that is collaborating with the instance of the first process model to achieve a collaborative result;

an exception handler configured to cause the at least one processor to store the exception effect in an exception repository, and configured to initiate an exception message for the executing instance of the second process model;

a message handler configured to cause the at least one processor to forward the exception message to the executing instance of the second process model, and a transaction resource engine configured to cause the at least one processor to ensure a transactional nature of the exception message with respect to the instances of the first process model and the second process model, including providing a unique exception ID to the exception effect and correlating a response to the exception message from the instance of the second process model with the exception ID to thereby facilitate resolution of the exception and achievement of the collaborative result.

2. The system of claim 1 wherein the orchestration engine is configured to cause the at least one processor to suspend at least a portion of the instance of the first process model in response to determining the exception.

3. The system of claim 1 wherein the exception analyzer is configured to cause the at least one processor to scan the other tasks of the instance of the first process model including scanning subsequent and/or parallel tasks of the instance of the first process model to determine that the exception effect is associated with suspension of at least one of the subsequent and/or parallel tasks.

4. The system of claim 1 wherein the exception analyzer is configured to cause the at least one processor to select subsequent message tasks after the task within the instance of the first process model that relate to prior message tasks before the task, the message tasks being associated with the executing instance of the second process model.

5. The system of claim 1 wherein the exception handler is configured to cause the at least one processor to store the exception effect in the exception repository including one or more of: information about the exception, an identification of the executing instance of the second process model, and/or one or more potential exception outcomes.

6. The system of claim 1 wherein the exception handler is configured to initiate the exception message based on a message label associated with the task of the instance of the first process model and with a corresponding task of the executing instance of the second process model.

7. The system of claim 1 where the message handler is configured to cause the at least one processor to forward the exception message to a publish-subscribe system to which the executing instance of the second process model subscribes.

8. The system of claim 1 wherein the exception handler is configured to cause the at least one processor to determine an outcome of the exception, and configured to notify the orchestration engine of the exception to initiate a corresponding response of the orchestration engine with respect to the instance of the first process model.

9. The system of claim 1 wherein the exception handler is configured to cause the at least one processor to determine an outcome of the exception, retrieve the exception effect from the exception repository, and initiate an exception outcome message for sending thereof by the message handler to the executing instance of the second process model.

10. The system of claim 1, wherein the exception message causes a suspension of execution of the executing instance of the second process model, and wherein the message handler is configured to receive notification of the suspension for storing of the notification within the exception repository.

11. The system of claim 1, comprising:
a process logic generator configured to provide a suspension block within the instance of the first process model during a design of the first process model, the suspension block including:
a first control task and a second control task; and
a parallel combination of a process branch and a suspension branch between the first control task and the second control task,
wherein the suspension branch includes an isolated task that is configured to activate during an execution of the instance of the first process model in response to a detection of the exception in a process task of the process branch, and configured, once activated, to run to completion without permitting interleaving of the process task.

12. A method comprising:
determining a collaborating process model instance to be notified of an exception in an execution of a task of a process model instance, the collaborating process model instance and the process model instance executing in a collaborating orchestration engine and an orchestration engine, respectively, wherein the exception causes the task to at least temporarily fail to execute to completion and wherein the collaborating process model instance is collaborating with the process model instance to achieve a collaborative result;
notifying a collaborating task of the collaborating process model instance of the exception, including sending an exception message to the collaborating task;
suspending an execution of the collaborating task of the collaborating process model instance within the collaborating orchestration engine, based on the exception message;
scanning other tasks of both the process model instance and the collaborating process model to determine an exception effect of the exception and/or of the suspension of the collaborating task thereon, wherein the scanning includes identifying tasks of the other tasks which are potentially affected and which are configured to send an inter-process model message;
storing the exception effect within an exception repository in conjunction with a unique exception ID; and
ensuring a transactional nature of the exception message with respect to the instances of the collaborating process model instance and the process model, including correlating a response to the exception message from the collaborating process model instance with the exception ID to thereby facilitate resolution of the exception and achievement of the collaborative result.

13. The method of claim 12 comprising:
determining an outcome of the exception within the process model instance;
notifying the collaborating process model instance of the outcome; and
resuming the suspended execution of the collaborating process model instance within the collaborating orchestration engine, based on the outcome.

14. The method of claim 12 wherein determining the collaborating process model instance comprises:
scanning subsequent and/or parallel branches of the process model to determine further-affected tasks which are also potentially affected by the exception; and
determining which of the task and the further-affected tasks is associated with a message interaction with the collaborating process model instance.

15. The method of claim 12 wherein suspending, at least partly, an execution of the collaborating process model instance within the collaborating orchestration engine, based on the notifying, comprises:
activating a first control task associated with a process branch and a suspension branch of the collaborating process model instance;
detecting the exception at an exception detection receiver task of the suspension branch;
activating an isolated task that is configured, once activated, to execute to completion without interleaving with a task of the process branch; and
activating a second control task that is configured to synchronize and merge the process branch and the suspension branch, upon completion of the isolated task.

16. A system including instructions recorded on a computer-readable storage medium and executable by at least one processor, the system comprising:
an orchestration engine configured to cause at least one processor to execute a collaborating process model instance in collaboration with execution of a process model instance, wherein the collaborating process model instance is collaborating with the process model instance to achieve a collaborative result, and wherein the orchestration engine is configured to:
receive an exception message related to a suspension of a task of the process model instance, the exception message being related to an exception which causes the task to at least temporarily fail to execute to completion;
determine that the suspension of the task requires suspension of a collaborating task of the collaborating process model instance;
suspend the collaborating task of the collaborating process model instance;
scan other tasks of the collaborating process model instance to determine an exception effect of the suspension of the collaborating task thereon, wherein the scanning includes identifying tasks of the other tasks which are potentially affected and which are configured to send a message to the process model instance;
store the exception effect within an exception repository;
send a response exception message to the process model instance in conjunction with a unique exception ID; and
ensure a transactional nature of the exception message with respect to the instances of the collaborating process model and the process model, including correlating the response to the exception message with the unique ID to thereby facilitate resolution of the exception and achievement of the collaborative result.

17. The system of claim 16 wherein the orchestration engine is configured to cause the at least one processor to correlate the collaborating task of the collaborating process model instance with the task of the process model instance, based on a message label associated with the collaborating task and with the task.

18. The system of claim 16 wherein the orchestration engine is configured to cause at least one processor to:
- receive a second exception message associated with resolution of the exception;
- determine that the second exception message indicates resumption of the collaborating task of the collaborating process model instance; and
- resume execution of the collaborating process model instance.

* * * * *